(12) United States Patent
Han

(10) Patent No.: US 7,072,528 B2
(45) Date of Patent: Jul. 4, 2006

(54) CUBIC CONVOLUTION INTERPOLATING APPARATUS AND METHOD THEREOF

(75) Inventor: Jong-ki Han, Kyungki-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 534 days.

(21) Appl. No.: 09/819,984

(22) Filed: Mar. 29, 2001

(65) Prior Publication Data

US 2002/0085770 A1 Jul. 4, 2002

(30) Foreign Application Priority Data

Aug. 23, 2000 (KR) ................................ 2000-48906

(51) Int. Cl.
*G06K 9/32* (2006.01)
*G06K 9/64* (2006.01)

(52) U.S. Cl. ...................................... 382/300; 382/279

(58) Field of Classification Search ................ 382/279, 382/300, 298, 299

See application file for complete search history.

(56) References Cited

U.S. PATENT DOCUMENTS

| | | | |
|---|---|---|---|
| 5,737,101 A * | 4/1998 | Ito .............................. | 358/525 |
| 6,263,120 B1 * | 7/2001 | Matsuoka .................... | 382/300 |
| 6,272,261 B1 * | 8/2001 | Matsuoka .................... | 382/276 |
| 6,473,533 B1 * | 10/2002 | Yokose et al. ............... | 382/248 |

* cited by examiner

*Primary Examiner*—Vikkram Bali
*Assistant Examiner*—Wes Tucker
(74) *Attorney, Agent, or Firm*—Staas & Halsey LLP

(57) ABSTRACT

A cubic convolution interpolating apparatus and method for performing interpolation by optimizing a parameter which determines the interpolation coefficients according to the local property of an image signal, which can minimize the quantity of information loss in a scaled or resampled image signal. The cubic convolution interpolating apparatus includes an image signal divider dividing an image signal into a plurality of subblocks, and a block generating parameters which determine cubic convolution interpolation coefficients in units of subblocks, and perform cubic convolution interpolation. The cubic convolution interpolating block includes a forward scaling processor sampling a cubic convolution interpolated continuous function of original image data transmitted from the divider using a first scaling factor and scaling the original image data, a backward scaling processor sampling a backward cubic convolution interpolated continuous function of the scaled data output from the forward scaling processor using a second scaling factor and restoring the scaled data into the original image data, and a parameter optimizer optimizing the parameter using the original image data and the data restored into the original image data output from the backward scaling processor, and transferring the optimized parameter to the forward scaling processor and the backward scaling processor, respectively. Therefore, even if an image includes various spatial frequency components, the quantity of lost information due to a change in the local property of the spatial frequencies can be minimized.

30 Claims, 4 Drawing Sheets

CUBIC CONVOLUTION INTERPOLATING APPARATUS AND METHOD THEREOF

CROSS REFERENCE TO RELATED APPLICATIONS

This application claims the benefit of Korean Patent Application No. 00-48906 filed on Aug. 23, 2000, the disclosure of which is incorporated herein by reference.

BACKGROUND OF THE INVENTION

1. Field of the Invention

The present invention relates to cubic convolution interpolation, and more particularly, to a cubic convolution interpolating apparatus which can minimize information loss due to a change in the resolution of an image signal, and a method thereof.

2. Description of the Related Art

Cubic convolution interpolation, which is one of various techniques of scaling or resampling original image data, has been proposed for compensating for a disadvantage encountered by conventional interpolation techniques in which a sin c(x) function is used. The interpolation technique using sin c(x) has been proposed for attaining more ideal interpolation, when an interpolated continuous function $\hat{f}(x)$ for original image sample data $f(x_k)$ is given by:

$$\hat{f}(x) = \sum_k c_k \beta(x - x_k) \quad (1)$$

which can then be rewritten, using a function of sin c(x), as:

$$\hat{f}(x) = \sum_k f(x_k) \operatorname{sinc}(x - x_k) \quad (2)$$

wherein $\beta(x)$ is a basis kernel function, $c_k$ is a coefficient concerning the image data of an arbitrary pixel, that is, $f(x_k)$, x is an interpolation point of an arbitrary pixel, and $x_k$ denotes sample points of original image data.

However, since the sin c(x) function is defined in an infinite region, a vast quantity of data must be calculated, which makes actual implementation impossible. Thus, a function that can be used in lieu of the sin c(x) function has been developed by many researchers, and the cubic convolution interpolation is one of the representative interpolation techniques using the newly developed function.

The cubic convolution interpolation uses in lieu of sin c(x) a basis kernel function $\beta(x)$ having an effective value in the region of (−2, 2), as represented by:

$$\beta(x) = \begin{pmatrix} (\alpha+2)|x|^3 - (\alpha+3)|x|^2 + 1 & 0 \leq |x| \leq 1 \\ \alpha|x|^3 - 5\alpha|x|^2 + 8\alpha|x| - 4\alpha & 1 \leq |x| \leq 2 \end{pmatrix} \quad (3)$$

In other words, when $s = x - x_k$ and $1 - s = x_{k+1} - x$ in the relationship between an interpolation point x and an ambient sampling point s, $0 \leq s \leq 1$ and $x_k \leq x \leq x_{k+1}$, by using the basis kernel function $\beta(x)$ in lieu of sin c(x), a cubic convolution interpolated continuous function can be obtained, as represented by:

$$\hat{f}(x) = f(x_{k-1})\{\alpha(s^3 - 2s^2 + s)\} + \quad (4)$$
$$f(x_k)\{\alpha(s^3 - s^2) + (2s^3 - 3s^2 + 1)\} +$$
$$f(x_{k+1})\{\alpha(-s^3 + 2s^2 - s) + (-2s^3 + 3s^2)\} +$$
$$f(x_{k+2})\{\alpha(-s^3 + s^2)\}$$

wherein $\{\alpha(s^3 - 2s^2 + s)\}$, $\{\alpha(s^3 - s^2) + (2s^3 - 3s^2 + 1)\}$, $\{\alpha(-s^3 + 2s^2 - s) + (-2s^3 + 3s^2)\}$ and $\{\alpha(-s^3 + s^2)\}$ are interpolation coefficients α is a parameter for varying the characteristic and shape of a basis kernel and determining the interpolation coefficient.

Rifman et al., (S. S. Rifman, *Digital Rectification of ERTS Multispectral Imagery* in Proc. Symp. Significant Results Obtained from ERTS-1(NASA SP-327), I, Sec. B, pp. 1131–1142, 1973) discloses an interpolation technique in which interpolation is performed by obtaining a cubic convolution interpolated continuous function such that α is set to −1 and the slopes of β(x) and sin c(x) coincide at a point where x=1. Keys et al. (R. G. Keys, *Cubic Convolution Interpolation for Digital Image Processing* IEEE transactions on Acoustic Speech Signal Processing, Vol. 29, pp.1153–1160, 1981) proposes an interpolation technique in which a is set to −½ and then a cubic convolution interpolated continuous function is obtained. However, according to these techniques, since α is a fixed value, a careful consideration cannot be taken into account for a variety of frequency characteristics of an image.

To overcome the drawback, Park et al. (S. K. Park and R. A. Schowengerdt, *Image Reconstruction by Parameteric Cubic Convolution*, Computer Visual Graphic Image Processing, Vol. 23, pp 258–272, 1983) proposes a cubic convolution interpolation technique in which α is used as a tuning parameter. According to this technique, optimized α is obtained by inferring the relationship between α and the frequency characteristic of original image data, and then the cubic convolution interpolation is implemented. However, according to this method, the optimized α is obtained by inferring the relationship between α and the overall frequency characteristic of one frame image to be processed. Thus, compared to the previous technique in which α is set to a fixed value, a consideration into the frequency characteristic of image data can be rather sufficiently taken. However, since α is inferred using the overall frequency characteristic of one frame image, in the case where the image has various spatial frequencies, the quantity of information loss associated with a change in the spatial frequency components becomes relatively increased, resulting in deterioration in the quality of scaled image data.

SUMMARY OF THE INVENTION

Accordingly, it is an object of the present invention to provide a cubic convolution interpolating apparatus and method, which can minimize the quantity of information loss in a scaled or resampled image signal.

It is another object of the present invention to provide a cubic convolution interpolating apparatus and method, for performing interpolation by optimizing a parameter which determines the interpolation coefficients according to the local property of an image signal.

Additional objects and advantages of the invention will be set forth in part in the description which follows, and, in part, will be obvious from the description, or may be learned by practice of the invention.

Accordingly, to achieve the above and other objects of the present invention, there is provided a cubic convolution interpolating apparatus including an image signal divider dividing an image signal into a plurality of subblocks, and a block generating parameters which determine cubic convolution interpolation coefficients in units of subblocks, and performing cubic convolution interpolation.

The cubic convolution interpolating block includes a forward scaling processor sampling a cubic convolution interpolated continuous function of original image data transmitted from the image signal divider using a first scaling factor and scaling the original image data, a backward scaling processor sampling a backward cubic convolution interpolated continuous function of the scaled data output from the forward scaling processor using a second scaling factor and restoring the scaled data into the original image data, and a parameter optimizer optimizing parameters using the original image data and the data restored in the original image data output from the backward scaling processor, and transferring the optimized parameter to the forward scaling processor and the backward scaling processor, respectively.

To achieve the above and other objects of present invention, there is provided a cubic convolution interpolating method including dividing an image signal into a plurality of subblocks, and generating parameters which determine cubic convolution interpolation coefficients in units of subblocks, and performing cubic convolution interpolation.

The cubic convolution interpolating method includes sampling a cubic convolution interpolated continuous function of original image data using a first scaling factor and forward scaling the original image data, sampling a backward cubic convolution interpolated continuous function of the scaled data obtained in the forward scaling processing step using a second scaling factor and restoring the scaled data backward into the original image data, determining and optimizing a parameter which determines the cubic convolution interpolation coefficient using the original image data and the data restored into the original image data by the backward scaling processing step, and supplying the optimized parameter to be used in forward scaling and backward scaling.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DESCRIPTION OF THE PREFERRED EMBODIMENTS

Figure 1:
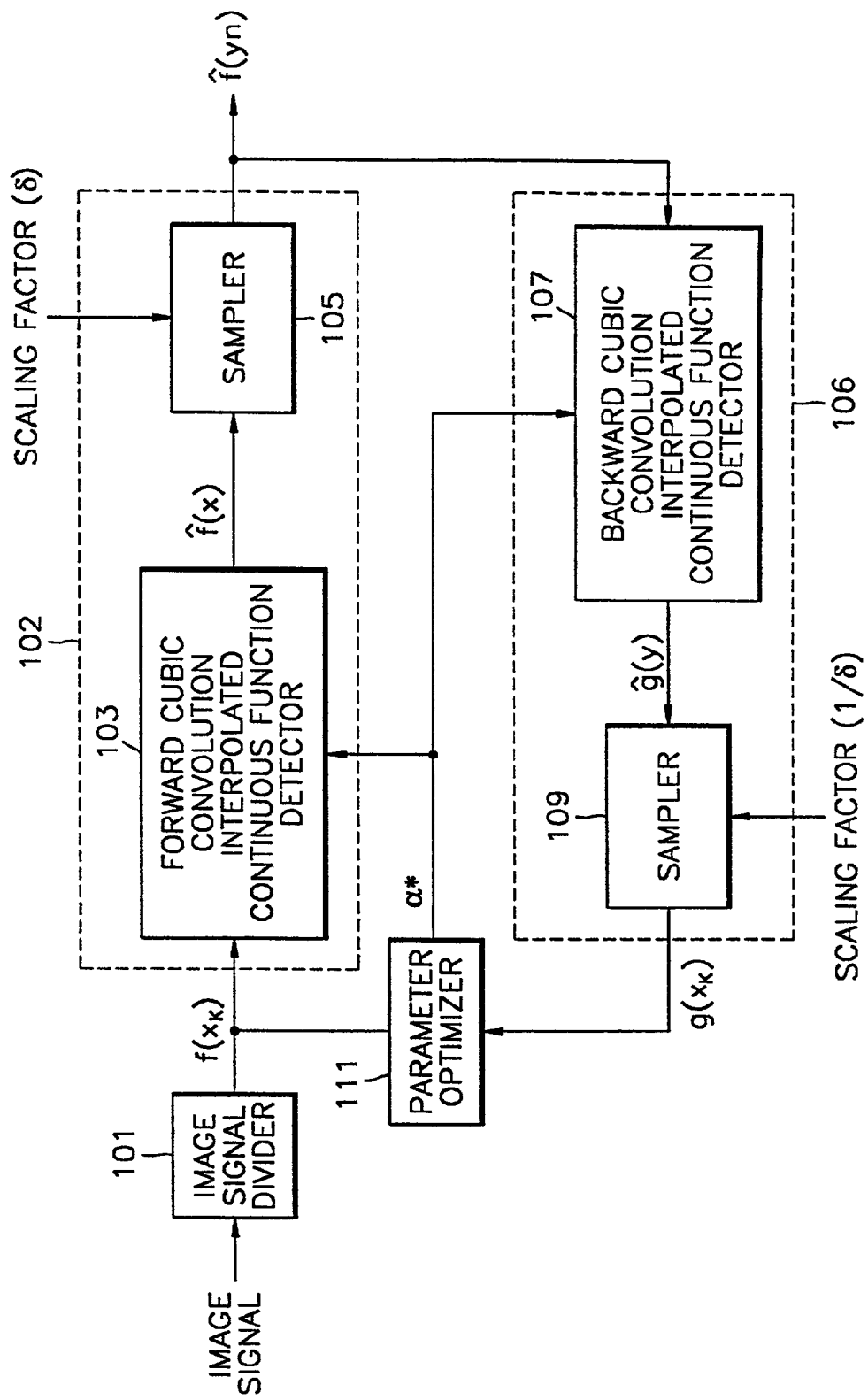
FIG. 1 is a block diagram of a cubic convolution interpolating apparatus according to the present invention.

Reference will now be made in detail to the preferred embodiments of the present invention, examples of which are illustrated in the accompanying drawings, wherein like reference numerals refer to like elements throughout.

FIG. 1 is a block diagram of a cubic convolution interpolator according to the present invention. The cubic convolution interpolator includes an image signal divider 101, a forward scaling processor 102, a backward scaling processor 106 and a parameter optimizer 111.

The forward scaling processor 102 includes a forward cubic convolution interpolated continuous function detector 103 and a sampler 105. The backward scaling processor 106 includes a backward cubic convolution interpolated continuous function detector 107 and a sampler 109.

The image signal divider 101 divides an input 1-frame image signal into n×n subblocks. In order to optimize α (a parameter which determines an interpolation coefficient) into units of subblocks, the image signal divider 101 sequentially transfers pixel-unit image data to a next stage unit, which is the forward cubic convolution interpolated continuous function detector 103. The pixel-unit image data is sampled data of an original video image.

The forward cubic convolution interpolated continuous function detector 103 detects a corresponding continuous function $\hat{f}(x)$ using the preset parameter α and the Equation (4) when the original image sample data $f(x_k)$ is applied thereto from the image signal divider 101. The preset parameter α is an initial value, e.g., −1 or −½, at an initial stage of interpolation, and is a replaced value when the initial value is replaced by interpolation.

The sampler 105 scales the forward cubic convolution interpolated continuous function $\hat{f}(x)$ using a scaling factor δ, as represented below:

$$\hat{f}(yn) = \hat{f}(x)\big|_{x=y_n=n\cdot\frac{1}{\delta}} \quad (5)$$

wherein n is an integer, and the sampler 105 outputs scaled data $\hat{f}(yn)$, which can be an enlarged or reduced image signal according to the scaling factor δ. The procedure for obtaining the scaled data $\hat{f}(yn)$, which is scaled from the cubic convolution interpolated continuous function $\hat{f}(x)$ for the original sample data $f(x_k)$, is referred to as forward scaling.

According to the present invention, in changing an original image into an enlarged or reduced image having a desired level of resolution using the forward scaling (in order to minimize the quantity of lost information in consideration of the local property of an image signal), backward scaling and optimization of the parameter α are performed as follows.

The backward cubic convolution interpolated continuous function detector 107 detects a cubic convolution interpolated continuous function $\hat{g}(y)$ using Equation (6) when the scaled data $\hat{f}(yn)$ is applied thereto:

$$\hat{g}(x) = \hat{f}(y_{n-1})\{\alpha(t^3 - 2t^2 + t)\} + \quad (6)$$
$$\hat{f}(y_n)\{\alpha(t^3 - t^2) + (2t^3 - 3t^3 - 3t^2 + 1)\} +$$
$$\hat{f}(y_{n+1})\{\alpha(-t^3 + 2t^2 - t) + (-2t^3 + 3t^2)\} +$$
$$\hat{f}(y_{k+2})\{\alpha(-t^3 + t^2)\}$$

wherein t is an ambient sampling point, like s in Example (4), and y is an interpolation point at which interpolation based on the scaled data $\hat{f}(yn)$ is performed.

The sampler 109 obtains $g(x_k)$, which is data restored into the original image data using a scaling factor $1/\delta$, when the cubic convolution interpolated continuous function $\hat{g}(y)$ is applied thereto, as represented below:

$$g(x_k) = \hat{g}(y)|_{y=x_k \cdot \delta} \qquad (7)$$
$$= \hat{g}(y)|_{t=x_k-y_n}$$

wherein $x_k$ is a sampling point of the data to be obtained, and $y_n$ is a point given by the scaled data $\hat{f}(yn)$. Unlike in the forward scaling in which $\delta$ is used as the scaling factor for enlarging image data, in the backward scaling, $1/\delta$ is used as the scaling factor in order to reduce the image data.

Figure 2:
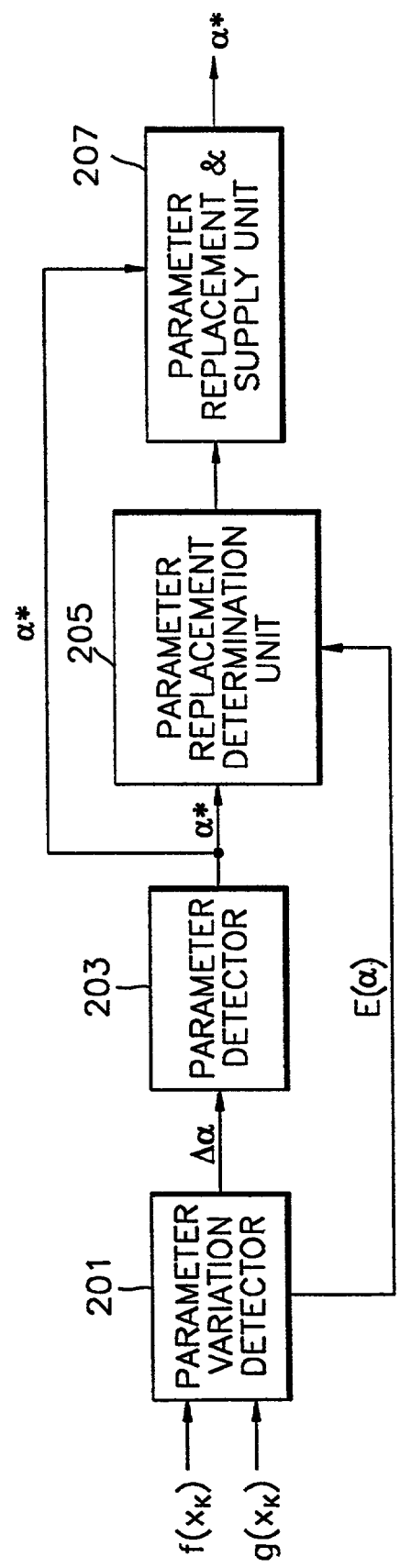
FIG. 2 is a detailed block diagram of a parameter optimizer shown in FIG. 1.

The parameter optimizer 111 obtains an optimized parameter a adapted to minimize the quantity of lost information when the original image sample data $f(x_k)$ and backward scaled data $g(x_k)$ are applied thereto. To this end, the parameter optimizer 111, as shown in FIG. 2, is constituted by a parameter variation detector 201, a parameter detector 203, a parameter replacement determination unit 205 and a parameter replacement & supply unit 207.

When the original image sample data $f(x_k)$ and backward scaled data $g(x_k)$ are applied to the parameter variation detector 201, the parameter variation detector 201 detects a parameter variation $\Delta \alpha$ as represented by:

$$\Delta \alpha = -\eta \frac{\partial E}{\partial \alpha}(\alpha) \qquad (8)$$

wherein $\eta$ is a nonnegative value, and the parameter a increases along the direction of the negative gradient $$\frac{\partial E}{\partial \alpha}(\alpha).$$

Also, the quantity of lost information of one subblock, that is, $E(\alpha)$ is obtained using the original image sample data $f(x_k)$ and backward scaled data $g(x_k)$ as represented by:

$$E(\alpha) = \sum_{\forall k} \{f(x_k) - g(x_k)\}^2 \qquad (9)$$

and thus $$\frac{\partial E}{\partial \alpha}(\alpha)$$

can be given by:

$$\frac{\partial E}{\partial \alpha}(\alpha) = \sum_{\forall k} \frac{\partial}{\partial \alpha}\{f(x_k) - g(x_k)\}^2 \qquad (10)$$

-continued
$$= \sum_{\forall k} 2\{f(x_k) - g(x_k)\}\left\{\frac{\partial}{\partial \alpha}f(x_k) - \frac{\partial}{\partial \alpha}g(x_k)\right\}$$

wherein, since $f(x_k)$ is a fixed pixel value for the original image data, $$\frac{\partial}{\partial \alpha}f(x_k)$$

is zero and $$\frac{\partial}{\partial \alpha}g(x_k)$$

can be obtained using Equations (6) and (7), as represented by:

$$\frac{\partial}{\partial \alpha}g(x) = \left\{\frac{\partial}{\partial \alpha}\hat{f}(y_{n-1})\alpha(t^3 - 2t^2 + t)\right. \qquad (11)$$
$$= \hat{f}(y_{n-1})(t^3 - 2t^2 + t) +$$
$$\frac{\partial}{\partial \alpha}\hat{f}(y_n)\alpha(t^3 - t^2) + (2t^3 - 3t^2 + 1) +$$
$$\hat{f}(y_n)(t^3 - t^2) +$$
$$\frac{\partial}{\partial \alpha}\hat{f}(y_{n+1})(\alpha(-t^3 + 2t^2 + 3t^2) + (-2t^3 + 3t^2)) +$$
$$\hat{f}(y_{n+1})(-t^3 + 2t^2 - t) +$$
$$\frac{\partial}{\partial \alpha}\hat{f}(y_{n+2})(-t^3 + t^2) +$$
$$\left.\hat{f}(y_{n+2})(-t^3 + t^2)\right\}|_{t=x_k-y_n, y_n \leq x_k \leq y_{n+1}}$$

In Equation (11), $$\frac{\partial}{\partial \alpha}\hat{f}(y_n)$$

can be written by:

$$\frac{\partial}{\partial \alpha}\hat{f}(y_n) = \{\hat{f}(x_{l-1})(s^3 - 2s^2 + s)\} + \qquad (12)$$
$$\hat{f}(x_l)\{(s^3 - s^2)\} +$$
$$\hat{f}(x_{l+1})\{(-s^3 + st^2 - s)\} +$$
$$\hat{f}(x_{l+2})\{(-s^3 + s^2)\}|_{s=y_n-x_l, x_l \leq y_n \leq x_{l+1}}$$

Then, the parameter variation detector 201 transfers the detected parameter variation $\Delta \alpha$ to the parameter detector 203. The parameter detector 203 detects an updated parameter $\alpha^*$, which is a value when the quantity of lost information, $E(\alpha)$, is minimum, as represented by:

$$\alpha^* = \alpha + \Delta \alpha \qquad (13)$$

and the detected updated parameter $\alpha^*$ is then transferred to the parameter replacement determination unit 205. When the updated parameter α* is applied, the parameter replacement determination unit 205 determines whether the updated parameter α* is to be replaced or not using the quantity of lost information E(α) transferred from the parameter variation detector 201.

The replacement or non-replacement of the updated parameter α*, which is determined by the parameter replacement determination unit 205, may be determined in units of frames or subblocks.

In the case of frame unit replacement, the replacement with the updated parameter α* is determined by:

$$\left\{\sum_{\forall i} E'_i - \sum_{\forall i} E_i\right\} / \sum_{\forall i} E_i^{>\varepsilon_T} \tag{14}$$

wherein $$\sum_{\forall i} E'_i$$

is the total quantity of lost information of a previous frame and $$\sum_{\forall i} E_i$$

is the total quantity of lost information of a current frame. Here, the total quantity of lost information is the sum of the quantities of lost information for the respective subblocks. As given by Equation (14), if a value obtained by subtracting the total quantity of lost information of a current frame from the total quantity of lost information of a previous frame (the value divided by the total quantity of lost information of a current frame) is greater than a threshold $\varepsilon_T$, the parameter replacement determination unit 205 determines that the parameter α is to be replaced with the updated parameter α* obtained in the current frame in units of subblocks. Here, as the threshold $\varepsilon_T$ is smaller, finer optimization is performed with respect to the parameter α.

However, if the operation result of Equation (14) is not greater than the threshold $\varepsilon_T$, the parameter replacement determination unit 205 determines that the parameter α is not to be replaced with the updated parameter α* obtained in the current frame in units of subblocks.

In the case of subblock unit replacement, the parameter replacement determination unit 205 determines whether replacement with the updated parameter α* is to be performed, as represented by:

$$\{E'_i - E_i\} / E_i > \varepsilon_T \tag{15}$$

wherein $E_i$, is the quantity of lost information of the ith subblock in a previous frame and $E_i$ is the quantity of lost information of the ith subblock in a current frame. As given by Equation (15), if a value obtained by subtracting the quantity of lost information of the corresponding subblock in a current frame from the quantity of lost information of the corresponding subblock in a previous frame divided by the quantity of lost information of the corresponding subblock in a current frame is greater than a threshold $\varepsilon_T$, the parameter replacement determination unit 205 determines that the parameter α is to be replaced with the updated parameter α*. However, if the result of Equation (15) is not greater than the threshold $\varepsilon_T$, the parameter replacement determination unit 205 determines that the parameter α is not to be replaced with the updated parameter α*.

The parameter replacement and supply unit 207 replaces the parameter α with the updated parameter α* according to the determination made by the parameter replacement determination unit 205, and then transfers the replaced updated parameter α* to the forward cubic convolution interpolated continuous function detector 103 and the backward cubic convolution interpolated continuous function detector 107, respectively. The replacement of the parameter α with the updated parameter α* may be processed in units of either frames or subblocks according to the implementation type of the parameter replacement determination unit 205. In other words, if the frame unit replacement is determined, the parameter replacement and supply unit 207 replaces the parameter with a new one in units of frames. If subblock unit replacement is determined, the parameter replacement and supply unit 207 replaces the parameter with new one in units of subblocks.

Replacement of the parameter α with the updated parameter α* and supply of the replaced parameter to the forward cubic convolution interpolated continuous function detector 103 and the backward cubic convolution interpolated continuous function detector 107 are iteratively performed until it is determined by the parameter replacement determination unit 205 that further parameter replacement is not necessary.

Figure 3:
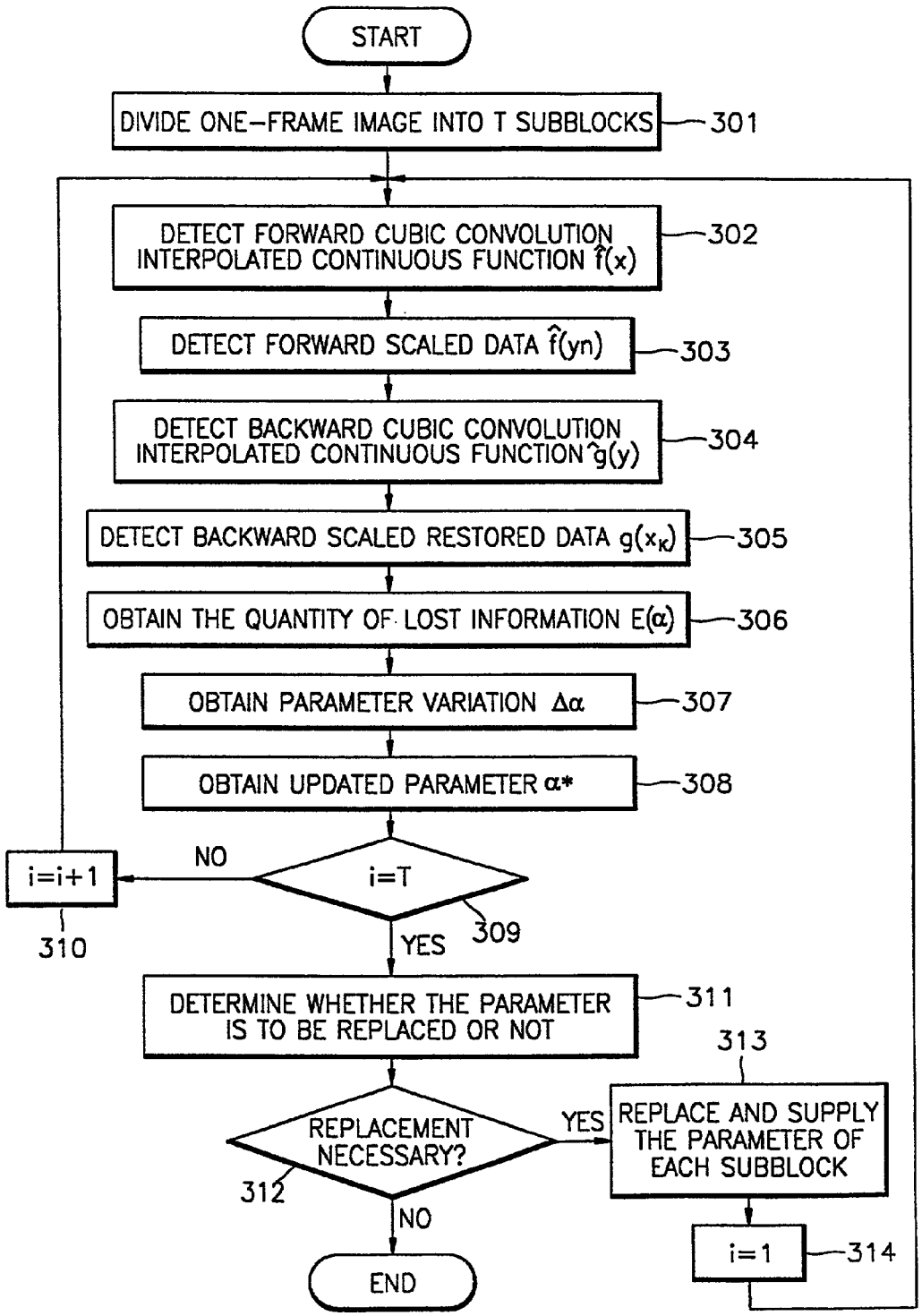
FIG. 3 is an operational flow diagram of a cubic convolution interpolation method according to an embodiment of the present invention.

FIG. 3 is an operational flow diagram of a cubic convolution interpolating method according to an embodiment of the present invention, in which the parameter α is replaced in units of frames.

In operation 301, a one-frame image to be scaled or resampled is divided into T subblocks. In operation 302, the forward cubic convolution interpolated continuous function $\hat{f}(x)$ for original sample data $f(x_k)$ is detected by Equation (5). Then, in operation 303, scaled data $\hat{f}(yn)$ is detected using the detected continuous function $\hat{f}(x)$ and a scaling factor δ.

In operation 304 a backward cubic convolution interpolated continuous function $\hat{g}(y)$ for the scaled data $\hat{f}(yn)$ is detected by Equation (6). In operation 305, backward scaled restored data $g(x_k)$ is detected using the backward cubic convolution interpolated continuous function $\hat{g}(y)$ and a scaling factor 1/δ.

In operation 306 the quantity of lost information E(α) is obtained by Equation (9) using the original image sample data $f(x_k)$ and the restored data $g(x_k)$. In operation 307 the parameter variation Δα of the corresponding subblock is obtained by Equation (8). In operation 308 the parameter replacement operation is performed on the obtained parameter variation Δα and the currently set parameter α as represented by Equation (13) to obtain an updated parameter α* of the corresponding subblock.

In operation 309, it is checked whether i equals T, wherein i is a subblock on which current cubic convolution interpolation is performed among subblocks contained in one frame. If i is equal to T, it is determined that cubic convolution interpolation has been performed on all subblocks in the corresponding frame. If i is not equal to T, it is determined that cubic convolution interpolation has not been performed on all subblocks in the corresponding frame.

Thus, in operation 310, i is incremented by 1 (i=i+1) for performing cubic convolution interpolation for a subsequent subblock, and then the routine is returned to operation 302 for iteration.

However, if i is equal to T, that is, if cubic convolution interpolation has been performed on all subblocks of the corresponding frame, it is determined in operation 311 whether the parameter is to be replaced or not. The determination is made in the same manner with the case of frame unit replacement determined by the parameter replacement determination unit 205.

If it is determined in operation 312 that replacement is necessary, the routine proceeds to operation 313 to replace the parameter of each subblock with the updated parameter α* and then supply the same to the forward cubic convolution interpolated continuous function detector 103 and the backward cubic convolution interpolated continuous function detector 107, respectively. In operation 314, i is set to 1 to iteratively perform forward and backward convolution interpolation in units of subblocks of the corresponding frame. However, if it is determined in operation 312 that replacement is not necessary, cubic convolution interpolation associated with parameter replacement is terminated.

Figure 4:
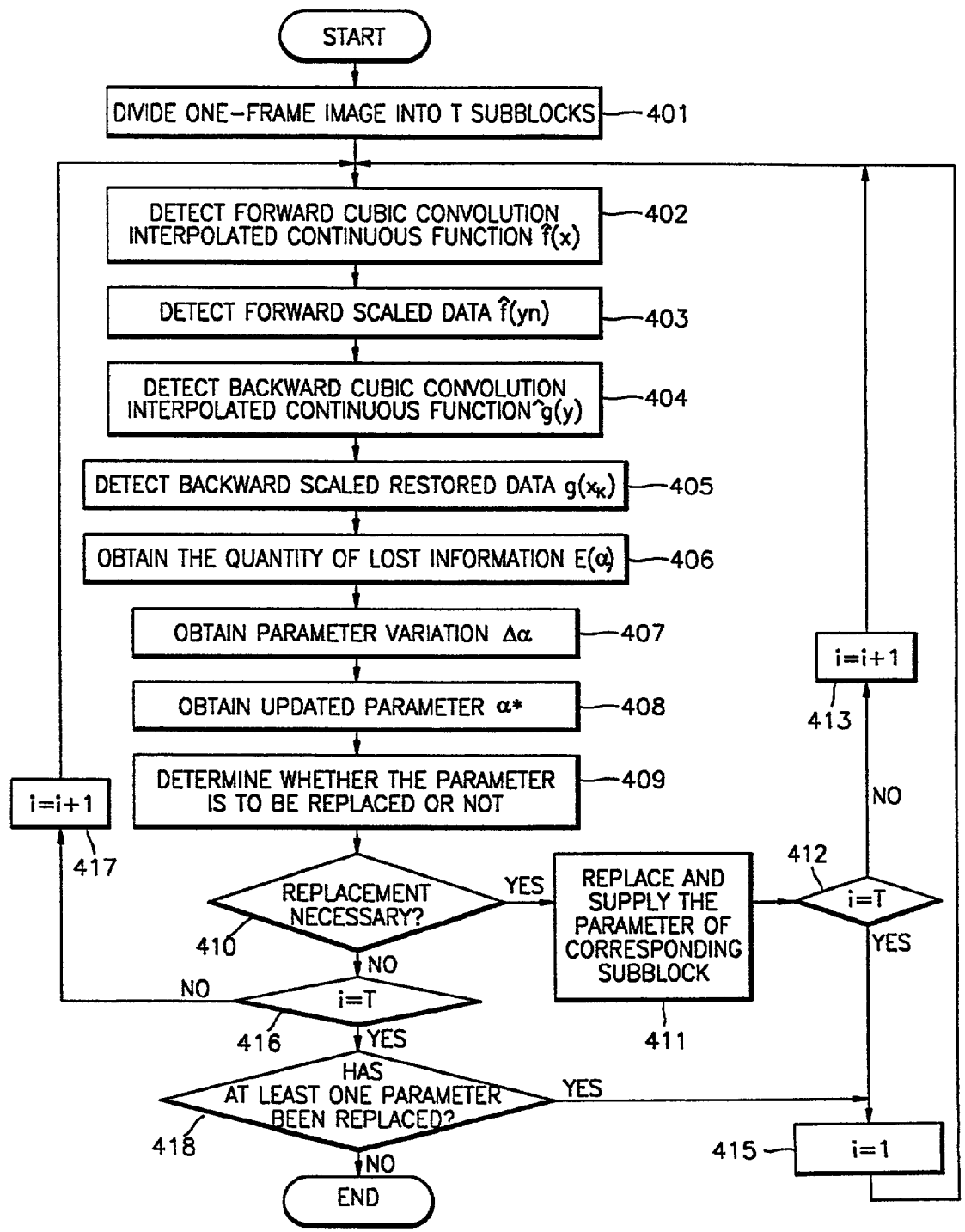
FIG. 4 is an operational flow diagram of a cubic convolution interpolation method according to another embodiment of the present invention.

FIG. 4 is an operational flow diagram of a cubic convolution interpolating method according to another embodiment of the present invention, in which the parameter α is replaced in units of subblocks.

Since the operations 401–408 are the same as the operations 301–308, an explanation thereof will not be given. If the updated parameter α* is obtained, it is determined by the parameter replacement determination unit 205 in step 409 whether the parameter is to be replaced or not.

If it is determined in operation 409 that replacement is necessary, the routine proceeds to operation 411 to replace the parameter α with the updated parameter α* to then supply the same to the forward cubic convolution interpolated continuous function detector 103 and the backward cubic convolution interpolated continuous function detector 107, respectively. In operation 412, it is checked whether or not i is equal to T. If i is not equal to T, the routine proceeds to operation 413 to increment i by one and then returns to operation 402 to perform cubic convolution interpolation for a subsequent subblock.

However, if it is determined in operation 412 that i is equal to T, i is set to 1 in operation 415 to then proceed to operation 402. This routine is iteratively performed until the parameter converges to a predetermined threshold value, which means that the parameter is not replaced with a new one.

If it is determined in operation 410 that replacement is not necessary, it is checked in operation 416 whether i is equal to T. If i is not equal to T, the routine proceeds to operation 417 to increment i by 1 and return to operation 402. However, if it is checked in operation 416 that i is equal to T, the routine proceeds to operation 418 to check whether or not at least one parameter for the corresponding one frame image has been replaced or not. If at least one parameter has been replaced, the routine proceeds to operation 415 to set i to 1 and then returns to operation 402 to iteratively perform the above procedure until the parameter converges to the predetermined threshold value.

According to the present invention, even if a one-frame image includes various spatial frequency components, the quantity of lost information due to a change in the local property of the spatial frequencies can be minimized, thereby improving the quality of scaled image data.

Although a few preferred embodiments of the present invention have been shown and described, it will be appreciated by those skilled in the art that changes may be made in these embodiments without departing from the principle and spirit of the invention, the scope of which is defined in the appended claims and their equivalents.

What is claimed is:

1. A cubic convolution interpolating apparatus comprising:
    an image signal divider dividing an image signal into a plurality of subblocks once as original image data; and
    a generating unit generating parameters which determine cubic convolution interpolation coefficients in units of the once divided subblocks, and performing cubic convolution interpolation on the original image data that is transmitted from the image signal divider,
    wherein the generating unit comprises:
        a forward scaling processor sampling a cubic convolution interpolated continuous function of the original image data transmitted from the image signal divider using a first scaling factor and scaling the original image data;
        a backward scaling processor sampling a backward cubic convolution interpolated continuous function of the scaled data output from the forward scaling processor using a second scaling factor and restoring the scaled data into the original image data; and
        a parameter optimizer optimizing the parameters using the original image data and the data restored into the original image data output from the backward scaling processor, and transferring the optimized parameters to the forward scaling processor and the backward scaling processor, respectively.

2. A cubic convolution interpolating apparatus comprising:
    an image signal divider dividing an image signal into a plurality of subblocks as original image data; and
    a generating unit generating parameters which determine cubic convolution interpolation coefficients in units of subblocks, and performing cubic convolution interpolation on the original image data,
    wherein the generating unit comprises:
        a forward scaling processor sampling a cubic convolution interpolated continuous function of the original image data transmitted from the image signal divider using a first scaling factor and scaling the original image data;
        a backward scaling processor sampling a backward cubic convolution interpolated continuous function of the scaled data output from the forward scaling processor using a second scaling factor and restoring the scaled data into the original image data; and
        a parameter optimizer optimizing the parameters using the original image data and the data restored into the original image data output from the backward scaling processor, and transferring the optimized parameters to the forward scaling processor and the backward scaling processor, respectively.

3. The cubic convolution interpolating apparatus according to claim 2, wherein the parameter optimizer comprises:
    a parameter variation detector detecting a parameter variation using the original image data and the restored data;
    a parameter detector detecting an updated parameter using the parameter variation and a currently set parameter;
    a parameter replacement determination unit determining whether the currently set parameter is to be replaced with the updated parameter; and
    a parameter replacement and supply unit processing replacement of the currently set parameter with the updated parameter according to the determination result of the parameter replacement determination unit and supplying the updated parameter to the forward scaling processor and the backward scaling processor.

4. The cubic convolution interpolating apparatus according to claim 3, wherein the parameter variation detector determines a quantity of lost information and the parameter replacement determination unit determines whether the currently set parameter is to be replaced using a difference between the total quantity of lost information of a previous frame and the total quantity of lost information of a current frame.

5. The cubic convolution interpolating apparatus according to claim 3, wherein the parameter replacement determination unit determines that the currently set parameter is to be replaced with the updated parameter if the operation result performed with respect to the total quantity of lost information of a previous frame and the total quantity of lost information of a current frame is greater than a predetermined threshold, the operation result given by:

$$\left\{\sum_{\forall i} E'_i - \sum_{\forall i} E_i\right\} / \sum_{\forall i} E_i > \varepsilon_T$$

wherein $$\sum_{\forall i} E_i$$

is the total quantity of lost information of a previous frame, $$\sum_{\forall i} E'_i$$

is the total quantity of lost information of a current frame, and $\varepsilon_T$ is the predetermined threshold.

6. The cubic convolution interpolating apparatus according to claim 3, wherein the parameter replacement determination unit determines that the currently set parameter is to be replaced with the updated parameter using a difference between the quantity of lost information of the corresponding subblock in a previous frame and the quantity of lost information of the corresponding subblock in a current frame.

7. The cubic convolution interpolating apparatus according to claim 3, wherein the parameter variation detector determines a quantity of lost information and the parameter replacement determination unit determines whether replacement with the updated parameter is to be done, if the operation result performed with respect to the quantity of lost information of the corresponding subblock in a previous frame and the quantity of lost information of the corresponding subblock in a current frame, is greater than a predetermined threshold, the operation result given by:

$$\{E'_i - E_i\} / E_i > \varepsilon_T$$

wherein $E_i'$ is the quantity of lost information of the corresponding subblock in a previous frame, $E_i$ is the quantity of lost information of the corresponding subblock in a current frame and $\varepsilon_T$ is the predetermined threshold.

8. The cubic convolution interpolating apparatus according to claim 3, wherein the parameter detector detects the updated parameter by incrementing the parameter variation to the currently set parameter.

9. The cubic convolution interpolating apparatus according to claim 3, wherein the parameter variation detector determines a quantity of lost information and the parameter variation detector detects a parameter variation using the quantity of lost information of the corresponding subblock, the quantity detected by performing an operation with respect to the original image data and the restored data, as represented by:

$$E(\alpha) = \sum_{\forall k} \{f(x_k) - g(x_k)\}^2$$

wherein $E(\alpha)$ is the quantity of lost information of the corresponding subblock, $f(x_k)$ is the original image data, and $g(x_k)$ is the restored data.

10. A cubic convolution interpolating apparatus comprising:
a forward scaling processor sampling a forward cubic convolution interpolated continuous function of original image data using a first scaling factor and scaling the original image data;
a backward scaling processor sampling a backward cubic convolution interpolated continuous function of the scaled data output from the forward scaling processor using a second scaling factor and restoring the scaled data into the original image data; and
a parameter optimizer optimizing a parameter using the original image data and the data restored into the original image data output from the backward scaling processor, and transferring the optimized parameter to the forward scaling processor and the backward scaling processor, respectively.

11. A cubic convolution interpolating method comprising:
dividing an image signal into a plurality of subblocks once; and
generating parameters which determine cubic convolution interpolation coefficients in units of the once divided subblocks, and performing cubic convolution interpolation on the plurality of once divided subblocks,
wherein the parameter generating comprises:
sampling a cubic convolution interpolated continuous function of original image data using a first scaling factor and forward scaling the original image data;
sampling a backward cubic convolution interpolated continuous function of the scaled data obtained in the forward scaling processing step using a second scaling factor and restoring the scaled data backward into the original image data;
determining and optimizing a parameter which determines the cubic convolution interpolation coefficient using the original image data and the data restored into the original image data by the backward scaling; and
supplying the optimized parameter to be used in the forward scaling and the backward scaling.

12. A cubic convolution interpolating method comprising:
sampling a cubic convolution interpolated continuous function of original image data using a first scaling factor and forward scaling the original image data;
sampling a backward cubic convolution interpolated continuous function of the scaled data obtained in the forward scaling processing step using a second scaling factor and restoring the scaled data backward into the original image data;

determining and optimizing a parameter which determines the cubic convolution interpolation coefficient using the original image data and the data restored into the original image data by the backward scaling; and supplying the optimized parameter to be used in the forward scaling and the backward scaling.

13. The cubic convolution interpolating method according to claim 12, wherein the parameter optimizing comprises:

obtaining a quantity of lost information using the original image data and the restored data;

obtaining a parameter variation based on the quantity of lost information;

obtaining a updated parameter using the parameter variation and a currently set parameter;

determining whether the currently set parameter is to be replaced with the updated parameter; and replacing the currently set parameter with the updated parameter if the currently set parameter is to be replaced with the updated parameter.

14. The cubic convolution interpolating method according to claim 13, wherein the obtaining of the quantity of lost information comprises obtaining a total quantity of lost information of a previous frame and a total quantity of lost information of a current frame; and the parameter replacement determining comprises using a difference between the total quantity of lost information of the previous frame and the total quantity of lost information of the current frame to determine whether the currently set parameter is to be replaced with the updated parameter.

15. The cubic convolution interpolating method according to claim 13, wherein; and the obtaining of the quantity of lost information comprises obtaining a total quantity of lost information of a previous frame and a total quantity of lost information of a current frame; and the parameter replacement determining comprises determining that the parameter is to be replaced with the updated parameter, if the operation result performed with respect to the total quantity of lost information of a previous frame and the total quantity of lost information of the current frame, is greater than a predetermined threshold, the operation result given by:

$$\left\{\sum_{\forall i} E_i' - \sum_{\forall i} E_i\right\} / \sum_{\forall i} E_i > \varepsilon_T$$

wherein $$\sum_{\forall i} E_i$$

is the total quantity of lost information of the previous frame, $$\sum_{\forall i} E_i'$$

is the total quantity of lost information of the current frame, and $\varepsilon_T$ is a predetermined threshold.

16. The cubic convolution interpolating method according to claim 13, further comprising iteratively performing the parameter optimizing and the optimized parameter supplying until further replacement is no longer necessary.

17. The cubic convolution interpolating method according to claim 13, further comprising dividing the original usage data into a plurality of subblocks prior to performing the cubic convolution interpolation.

18. The cubic convolution interpolating method according to claim 17, wherein the obtaining the quantity of lost information is performed in units of subblocks.

19. The cubic convolution interpolating method according to claim 17, wherein the updated parameter obtaining comprises incrementing the parameter variation to the currently set parameter.

20. The cubic convolution interpolating method according to claim 17, wherein the parameter replacement determining comprises determining that replacement with the updated parameter is to be performed if the operation result performed with respect to the quantity of lost information of the corresponding subblock in a previous frame and the quantity of lost information of the corresponding subblock in a current frame is greater than a predetermined threshold, the operation result given by:

$$\{E_i' - E_i\}/E_i > \varepsilon_T$$

wherein $E_i'$ is the quantity of lost information of the corresponding subblock in the previous frame, $E_i$ is the quantity of lost information of the corresponding subblock in the current frame and $\varepsilon_T$ is the predetermined threshold.

21. The cubic convolution interpolating apparatus according to claim 3, wherein the parameter variation detector determines a quantity of information of the original image data using the restored data, and detects the updated parameter when the quantity of lost information is a minimum.

22. The cubic convolution interpolating method according to claim 13, wherein the updated parameter obtaining comprises:

determining a quantity of information of the original image data using the restored data; and obtaining the updated parameter when the quantity of lost information is a minimum.

23. The cubic convolution interpolating apparatus according to claim 3, wherein the parameter replacement and supply unit determines whether a first value of a current one of the subblocks values equals a total value of the subblocks in one frame, wherein if the first value equals a total value, the parameter replacement and supply unit determines whether the currently set parameter is to be replaced, replaces the currently set parameter with the updated parameter if the currently set parameter is to be replaced, and resets the first value to an initial value, and if the first value does not equal a total value, the parameter replacement and supply unit increments the first value, and the forward scaling processor samples a cubic convolution interpolated continuous function of a next one of the subblocks.

24. The cubic convolution interpolating apparatus according to claim 3, wherein the parameter replacement and supply unit determines whether the currently set parameter is to be replaced, wherein the parameter replacement and supply unit replaces the currently set parameter with the updated parameter if the currently set parameter is to be replaced, checks whether a first value of a current one of the subblocks values equals a total value of the subblocks in one frame, increments the first value and then the forward scaling processor samples a cubic convolution interpolated continuous function of a next one of the subblocks, if the first value does not equal the current value, intializes the first value and then the forward scaling processor samples the cubic convolution interpolated continuous function of the next one of the subblocks, if the first value equals the total value;

the parameter replacement and supply unit increments the first value and then the forward scaling processor samples the cubic convolution interpolated continuous function of the next one of the subblocks, if the currently set parameter is not to be replaced and the first value equals the total value; and the parameter replacement and supply unit checks whether at least one parameter for a corresponding one frame image has been replaced if the currently set parameter is not to be replaced and the first value equals the total value, and initializes the first value and then the forward scaling processor samples the cubic convolution interpolated continuous function of the next one of the subblocks, if the at least one parameter has been replaced.

25. A cubic convolution interpolating apparatus used with an image signal, comprising:
 a generating unit generating parameters which determine interpolation coefficients of the image signal according to a forward scaling and a backward scaling of the image signal each of the forward and backward scaling using a different scaling factor, wherein the generating unit comprises:
  a parameter optimizer optimizing a parameter according to a local property of the image signal; and
  a cubic convolution interpolator performing a cubic convolution interpolation on the image signal using the optimized parameter.

26. A cubic convolution interpolating method for an image signal, comprising:
 generating parameters which determine interpolation coefficients of the image signal according to a forward scaling of the image signal and a backward scaling of the forward scaled image signal;
 optimizing a parameter according to a local property of the image signal; and performing a cubic convolution interpolation on the image signal using the optimized parameter,
 wherein a different scaling factor is respectively used for the forward scaling and the backward scaling.

27. A cubic convolution interpolating method comprising:
 dividing an image signal into a plurality of subblocks; and
 generating parameters which determine cubic convolution interpolation coefficients in units of subblocks, and performing cubic convolution interpolation on the plurality of subblocks.
 wherein the parameter generating comprises:
  sampling a cubic convolution interpolated continuous function of original image data using a first scaling factor and forward scaling the original image data;
  sampling a backward cubic convolution interpolated continuous function of the scaled data obtained in the forward scaling processing step using a second scaling factor and restoring the scaled data backward into the original image data;
  determining and optimizing a parameter which determines the cubic convolution interpolation coefficient using the original image data and the data restored into the original image data by the backward scaling; and
  supplying the optimized parameter to be used in the forward scaling and the backward scaling.

28. The cubic convolution interpolating method according to claim 27, wherein the parameter optimizing comprises:
 obtaining a quantity of lost information using the original image data and the restored data;
 obtaining a parameter variation based on the quantity of lost information;
 obtaining a updated parameter using the parameter variation and a currently set parameter;
 determining whether the currently set parameter is to be replaced with the updated parameter; and
 replacing the currently set parameter with the updated parameter if the currently set parameter is to be replaced with the updated parameter.

29. The cubic convolution interpolating method according to claim 28, wherein
 the replacing of the currently set parameter with the updated parameter comprises:
 determining whether a first value of a current one of the subblocks values equals a total value of the subblocks in one frame, such that if the first value equals the total value, the currently set parameter is replaced if determined that the currently set parameter is to be replaced and then the first value is reset to an initial value and sampling a cubic convolution interpolated continuous function on the next one of the subblocks is performed, or if the first value does not equal the total value, the first value is incremented, and sampling a cubic convolution interpolated continuous function on the next one of the subblocks is performed.

30. The cubic convolution interpolating method according to claim 28, wherein
 the replacing of the currently set parameter with the updated parameter comprises:
 determining whether the currently set parameter is to be replaced;
 replacing the currently set parameter with the updated parameter if the currently set parameter is to be replaced, checking whether a first value of a current one of the subblocks values equals a total value of the subblocks in one frame, incrementing the first value and then sampling a cubic convolution interpolation continuous function of a next one of the subblocks, if the first value does not equal the total value, or initializing the first value and then sampling the cubic convolution interpolated continuous function of the next one of the subblocks if the first value equals the total value;
 incrementing the first value and then sampling the cubic convolution interpolated continuous function of the next one of the subblocks, if the currently set parameter is not to be replaced and the first value does not equal the total value; and
 checking whether at least one parameter for a corresponding one frame image has been replaced if the currently set parameter is not to be replaced and the first value equals the total value, and initializing the first value and then sampling the cubic convolution interpolated continuous function of the next one of the subblocks, if the at least one parameter has been replaced.

* * * * *

UNITED STATES PATENT AND TRADEMARK OFFICE
CERTIFICATE OF CORRECTION

| | | |
|---|---|---|
| PATENT NO. | : 7,072,528 B2 | Page 1 of 1 |
| APPLICATION NO. | : 09/819984 | |
| DATED | : July 4, 2006 | |
| INVENTOR(S) | : Jong-ki Han | |

It is certified that error appears in the above-identified patent and that said Letters Patent is hereby corrected as shown below:

Column 11, line 27-28 approx. change "$\sum_{\forall i} E_i$" to -- $\sum_{\forall i} E_i'$ --

Column 11, line 33-34 approx., change "$\sum_{\forall i} E_i'$" to -- $\sum_{\forall i} E_i$ --

Column 13, line 52-53 approx., change "$\sum_{\forall i} E_i$" to -- $\sum_{\forall i} E_i'$ --

Column 13, line 57-58 approx., change "$\sum_{\forall i} E_i'$" to -- $\sum_{\forall i} E_i$ --

Column 15, line 3, change "intializes" to --initializes--

Column 15, line 52, change "subblocks." to --subblocks--

Signed and Sealed this

Twenty-fifth Day of September, 2007

JON W. DUDAS
*Director of the United States Patent and Trademark Office*